(12) United States Patent
Jin et al.

(10) Patent No.: US 8,134,979 B2
(45) Date of Patent: Mar. 13, 2012

(54) SELF-BACKHAUL METHOD AND APPARATUS IN WIRELESS COMMUNICATION NETWORKS

(75) Inventors: Shan Jin, Shanghai (CN); Jimin Liu, Shanghai (CN); Xiaobing Leng, Shanghai (CN); Gang Shen, Shanghai (CN)

(73) Assignee: Alcatel Lucent, Paris (FR)

( * ) Notice: Subject to any disclaimer, the term of this patent is extended or adjusted under 35 U.S.C. 154(b) by 794 days.

(21) Appl. No.: 11/558,189

(22) Filed: Nov. 9, 2006

(65) Prior Publication Data

US 2007/0110005 A1 May 17, 2007

(30) Foreign Application Priority Data

Nov. 11, 2005 (CN) .......................... 2005 1 0110325

(51) Int. Cl.
*H04B 7/216* (2006.01)
(52) U.S. Cl. .................. 370/335; 455/422.1; 455/428; 455/450; 455/453; 455/11.1; 370/315; 370/328
(58) Field of Classification Search .................. 370/328, 370/338, 315; 455/41.2, 422.1, 428, 450, 455/11.1
See application file for complete search history.

(56) References Cited

U.S. PATENT DOCUMENTS

| | | | | |
|---|---|---|---|---|
| 5,974,325 | A * | 10/1999 | Kotzin et al. ................ | 455/450 |
| 6,957,042 | B2 * | 10/2005 | Williams ...................... | 455/7 |
| 7,218,891 | B2 * | 5/2007 | Periyalwar et al. ......... | 455/13.1 |
| 7,321,571 | B2 * | 1/2008 | Schnack et al. ............. | 370/320 |
| 2002/0072375 | A1 | 6/2002 | Huslig | |
| 2004/0062214 | A1 | 4/2004 | Schnack et al. | |
| 2004/0095907 | A1 * | 5/2004 | Agee et al. .................. | 370/334 |
| 2005/0048914 | A1 | 3/2005 | Sartori et al. | |
| 2005/0157694 | A1 | 7/2005 | Lu et al. | |
| 2005/0286451 | A1 | 12/2005 | Kim et al. | |
| 2006/0098609 | A1 * | 5/2006 | Henderson et al. ......... | 370/338 |

(Continued)

FOREIGN PATENT DOCUMENTS

CN     1414804 A     4/2003

(Continued)

OTHER PUBLICATIONS

Carl Eklund, Roger B. Marks, and Kenneth L. Stanwood, "IEEE Standard 802.16: A Technical Overview of the WirelessMAN Air Interface for Broadband Wireless Access", IEEE Communications Magazine, Jun. 2002, pp. 98-107.

(Continued)

*Primary Examiner* — Kamran Afshar
*Assistant Examiner* — Edward Zhang
(74) *Attorney, Agent, or Firm* — Fay Sharpe LLP

(57) ABSTRACT

The present invention relates to a wireless self-backhaul technique in a wireless communication network, especially in a WiMAX network, which implements wireless backhaul between base stations by using radio resources (frequency, sub-band or timeslot) of base stations' own. More specifically, uplink and downlink backhaul channels are formed between a master base station and a slaver base station using base stations' inherent resources and through offsetting the frame start time of the slaver base station for a period of time in relation to the master base station. The slaver base station operates in base station mode during local user access and operates in subscriber station mode during implementing wireless backhaul traffic with the master base station. Therefore, the slaver base station needs to switch between these two operating modes.

23 Claims, 8 Drawing Sheets

U.S. PATENT DOCUMENTS

| | | | |
|---|---|---|---|
| 2006/0099954 A1* | 5/2006 | Henderson et al. | 455/447 |
| 2007/0004437 A1* | 1/2007 | Harada et al. | 455/506 |
| 2007/0010250 A1* | 1/2007 | Bosch et al. | 455/436 |
| 2007/0109902 A1 | 5/2007 | Taniguchi et al. | |
| 2007/0109989 A1* | 5/2007 | Nakagawa et al. | 370/328 |
| 2007/0110004 A1 | 5/2007 | Liu et al. | |
| 2007/0159957 A1 | 7/2007 | Ljung et al. | |
| 2007/0254595 A1* | 11/2007 | Yoon et al. | 455/67.14 |

FOREIGN PATENT DOCUMENTS

| | | |
|---|---|---|
| WO | WO 02/080483 | 10/2002 |
| WO | WO 02/080483 A | 10/2002 |
| WO | WO 02/080483 A1 | 10/2002 |

OTHER PUBLICATIONS

Gambiroza V., et al.: "End-to-End Performance and Fairness in Multihop Wireless Backhaul Networks," Sep. 26, 2004, Proceedings of the 10$^{th}$ Annual International Conference on Mobile Computing and Networking, Mobicom 2004, Philadelphia, PA, Sep. 26-Oct. 1, 2004, Annual International Conference on Mobile Computing and Networking, New York, NY, ACM, US, pp. 2, XP001235039.

Tzu-Jane Tsai, et al.: "IEEE 802.11 Mac Protocol over Wireless Mesh Networks: Problems and Perspectives" Mar. 25, 2005, Advanced Information Networking and Applications, 2005, 19$^{th}$ International Conference on Taipei, Taiwan Mar. 25-30, 2005, Piscataway, NJ, USA, IEEE, pp. 60-63, XP010789968.

U.S. Appl. No. 11/558,055, filed Nov. 9, 2006, Erwu Liu, et al.

U.S. Appl. No. 11/558,201, filed Nov. 9, 2006, Xiaobing Leng, et al.

Masahito Asa and David T. Chen, et al., Concepts for 802.16-based Mobile Multi-hop Relay Networking, Jul. 19, 2005.

eMGW Solutions, Enabling Operators to Provide Cost Effective Voice Services to Sparsely Populated Rural Areas, pp. 1-7, Alvarion, Copyright 2005.

U.S. Appl. No. 11/558,055, filed Nov. 9, 2006, titled Method and Base Station for Bandwidth Allocation in Wireless Single-Hop Self-Backhaul.

U.S. Appl. No. 11/558,201, filed Nov. 9, 2006, titled Method and Apparatus for Implementing Relay.

Carl Eklund, Roger B. Marks, and Kenneth L. Stanwood, "IEEE Stanard 802.16: A Technical Overview of the WirelessMAN Air Interface for Broadband Wireless Access", 2002 IEEE.

Zhang Ping, Li Zhiming, Yan Honghua, "Method of implementing direct communication between base stations", Application No. 01136643, English translation of abstract and claims of Chinese Publication No. CN 1414804 A, application date Oct. 24, 2001.

\* cited by examiner

SELF-BACKHAUL METHOD AND APPARATUS IN WIRELESS COMMUNICATION NETWORKS

CROSS-REFERENCE TO RELATED APPLICATION(S)

This application is based on the Chinese Patent Application No. 200510110325.6 filed on Nov. 11, 2005, the disclosure of which is hereby incorporated by reference.

FIELD OF THE INVENTION

The present invention relates to wireless communication networks, and particularly to the self-backhaul technique in wireless communication networks.

BACKGROUND OF THE INVENTION

At the beginning of deployment, wireless communication networks, like WiMAX networks (world interoperability microwave access, a wireless metropolitan network technique based on IEEE 802.16 serial standards), are mainly directed to developing countries, outskirts and areas where network infrastructure is not very perfect. There, the number of initial subscribers is very limited, the type of service applications is simplistic, and the demand for network capacity is relatively small. At this point, the key to success lies in how to use the low-cost network coverage technique to enable wireless communication networks to achieve large-scale coverage and fast capture the market. As a solution to "low-mobility broadband IP access", the WiMAX technique has drawn attention of all parties. How to use relevant low-cost techniques to achieve large-scale WiMAX deployment in the early commercial stages has become a major factor in the large-scale application of the WiMAX technique.

A critical problem for achieving the above large-scale application of wireless communication networks lies in how to achieve fast networking and reduce network construction costs. In this regard, backhaul backhaul has received increasing attention from operators due to its effective approaches to the problems like a high networking cost and difficult wiring. And the technique of using radio resources of a WiMAX base station per se to implement radio backhaul links can solve problems more effectively.

Among the prior arts, there is disclosed a radio microwave technique, like the LMDS technique, to provide a technical solution of wireless return channels for the large-scale WiMAX deployment. The specific solution is as shown in FIG. 1:

In the solution as illustrated in FIG. 1, a WiMAX base station is used for achieving data access of terminal subscribers, and LMDS equipment is used for implementing return channels of WiMAX traffic. The combination of these two techniques can support WiMAX wireless network deployment. While the WiMAX network is being deployed, LMDS equipment should be correspondingly added at the places of each WiMAX base station and a radio access control point (RAC). Additionally, the operator needs to apply for operating frequency resources of both WiMAX and LMDS.

As illustrated in FIG. 1, although the combination of WiMAX and LMDS techniques can support WiMAX wireless return network deployment, costs of the network construction investment and daily operation and maintenance are very high, because two kinds of equipment need to be used during network deployment.

More importantly, these two techniques need to use different radio frequency resources. In practical applications, frequency resources are usually auctions off to operators by the government, and it is hard for most operators to have such abundant frequency resources in specific areas.

Additionally, after years of development, the LMDS technique still does not have a global unified standard, and the interworking of products by different manufacturers is extremely difficult.

Furthermore, LMDS operates in high band and must work in the LOS (line-of-sight) mode, which also restricts its application range.

U.S. Patent Application No. 2004/0062214A1 discloses an in-band wireless communication network backhaul technique. By using allocated spectrum from the mobile station air interface, one or more remote, child access points within a wireless communication network establish backhaul connections to a parent access point having conventional backhaul links to the network. In this manner, backhaul traffic is carried on the standard air interface coexistent with the normal mobile station traffic. However, in the disclosure of this US patent application, one of two base stations implementing backhaul traffic needs to be equipped with a backhaul module and corresponding antennas, wherein the backhaul module acts as a mobile station. Via this backhaul module, a mobile station implements backhaul traffic with another base station. Thus, costs of the network construction investment and daily operation and maintenance will still increase.

SUMMARY OF THE INVENTION

An object of the present invention is, in order to overcome the above disadvantages in the prior arts, to provide wireless backhaul traffic (also called wireless self backhaul) between two base stations by using radio resources of wireless base stations' own in a wireless communication network, especially in a WiMAX network, without the need to increasing other hardware equipment.

A wireless self-backhaul system, which goes on the premise of conforming to the IEEE 802.16 protocol, uses radio resources (including frequency, sub-band, time slot) of wireless base stations' (e.g. WiMAX base stations) own to implement wireless return channels between wireless base stations (e.g. WiMAX base stations) and from wireless base stations (e.g. WiMAX base stations) to wireless access control equipment while providing wireless access for terminal users. The wireless self-backhaul system is transparent to terminal users.

The technical key points to implementing the wireless self-backhaul system comprise: improvements on wireless base stations (e.g. WiMAX base stations), including how to use radio resources; definitions of base station frame structures; and how to use wireless return channels to implement communication and return transmission between wireless base stations (e.g. WiMAX base stations) and terminal users.

FIG. 2 illustrates a schematic layout view of an end-to-end network of the wireless self-backhaul system. As illustrated in FIG. 2, the basic idea of the present invention is to define a novel wireless self-backhaul system, and use time offset to classify base stations that are located in different positions into master base station, relay base station, slaver base stations, etc., in which the master base station operates in base station mode throughout the implementation of backhaul traffic, the relay station operates in subscriber station mode when implementing backhaul traffic with its last level base station and operates in base station mode when implementing backhaul traffic with its next level base station, and the slaver base station operates in subscriber station mode throughout the implementation of backhaul traffic. Base stations at any two levels implement backhaul traffic by using their own radio resources. For example, uplink and downlink backhaul windows between base stations at two levels can be formed with a relative offset (time offset) of frame start time between base stations, so that communication between base stations (i.e. backhaul traffic) can be implemented by using radio resources of base stations' own to achieve the implementation solution of wireless self-return channels from base stations to wireless access control equipment. The present invention further defines specific frame structures of base stations, a specific solution for timeslot offset between base stations and other technical details for a WiMAX system.

According to a first aspect of the present invention, provided is a method of implementing wireless traffic backhaul between a first base station and a second base station in a wireless communication network, which comprises the following steps: a) forming an uplink backhaul channel and a downlink backhaul channel between said first base station and said second base station by using timeslots of base stations' own; b) implementing uplink and downlink traffic backhaul between said first base station and said second base station by using said uplink backhaul channel and said downlink backhaul channel. Preferably, step a) is offsetting the frame start time of the second base station for a period of time in relation to the frame of the first base station, so as to form an uplink backhaul channel and a downlink backhaul channel between said first base station and said second base station.

According to a second aspect of the present invention, provided is a base station of implementing wireless backhaul in a wireless communication network, said base station being the master base station of a second base station and comprising transceiver means for receiving from and sending to a subscriber station information, wherein said transceiver means is further used for receiving from and sending to the second base station backhaul information over uplink and downlink backhaul channels between said base station and said second base station that are formed by using timeslots of base stations' own. Preferably, said uplink and downlink backhaul channels are formed by offsetting the frame start time of the second base station for a period of time in relation to the frame of said master base station.

According to a third aspect of the present invention, provided is a wireless base station of implementing wireless backhaul as a master base station in a wireless communication network, said base station being the salver base station of a first base station and comprising transceiver means for receiving from or sending to a subscriber station information. Said transceiver means is further used for receiving from and sending to the first wireless base station backhaul information over uplink and downlink backhaul channels between said base station and said first base station that are formed by using timeslots of base stations' own. Preferably, the uplink and downlink backhaul channels between said base station and the first base station are formed by offsetting the frame start time of said base station for a period of time in relation to the frame of said first base station.

In a preferred embodiment, said wireless base station serving as a slaver base station further comprises: mode determining means for determining whether said base station will switch between local user access traffic and wireless backhaul traffic; and mode switching means for switching the operating mode of said base station when it is determined that said base station will switch between local user access traffic and wireless backhaul traffic.

Compared with the prior arts, the technical solution of the present invention achieves wireless communication between base stations by using radio resources of base stations' own, and wireless communication networks of the prior arts do not have such a function. During network deployment by using the present invention, the same kind of equipment is used without adding new hardware equipment or applying for different frequency resources, so that users' investment and operation costs are greatly reduced. Moreover, since the strong wireless transmission capability which a base station itself has is used in wireless backhaul traffic, the wireless return transmission capability can be significantly improved.

BRIEF DESCRIPTION OF THE DRAWINGS

Hereinafter, the present invention will be further described with reference to the accompanying drawings.

DETAILED DESCRIPTION OF PREFERRED EMBODIMENTS

According to an embodiment of the present invention, a complete frame, such as a complete IEEE 802.16 frame, of a base station in a wireless communication network can be divided into two parts. Part of the timeslots is used for the wireless backhaul functionality, and the other part is still used for the ordinary user access functionality (e.g. the WiMAX user access functionality). Two base stations transferring backhaul traffic asynchronously perform the receiving and transmitting functionality in time slices corresponding to receiving and transmitting timeslots of the master and slave base stations.

In a backhaul timeslot, one base station is in a transmitting state while the other one is in a receiving state. In a user access timeslot, the two base stations perform reception and transmission at the same time. The mater and slaver base stations communicate with their respective subscriber stations.

Base stations within the wireless communication networks are classified as master base stations and slaver base stations. During the process of serving as a master base station, a base station functions as a base station, and a slaver base station communicates with a master base station, assuming as a subscriber station during setup of radio backhaul channels and assuming as an ordinary base station during local user access. Therefore, a slaver base station needs to be switched between operating modes. That is to say, when a plurality of base stations are successively connected, an intermediate base station is a slaver base station in relation to its master base station, and is a master base station in relation to its slaver base station.

The master base station and the slaver base station have the same frame length, whereas there is a period of time offset in start time of the frames between the master base station and the slaver base station. This period of time offset is used for transferring backhaul traffic, and the offset can be adjusted in accordance with concrete radio resource scheduling algorithm and radio resource reservation algorithm.

The master base station and the salver base station will respectively use frame structures as defined in the present text, but are not limited to the definitions.

Figure 1:
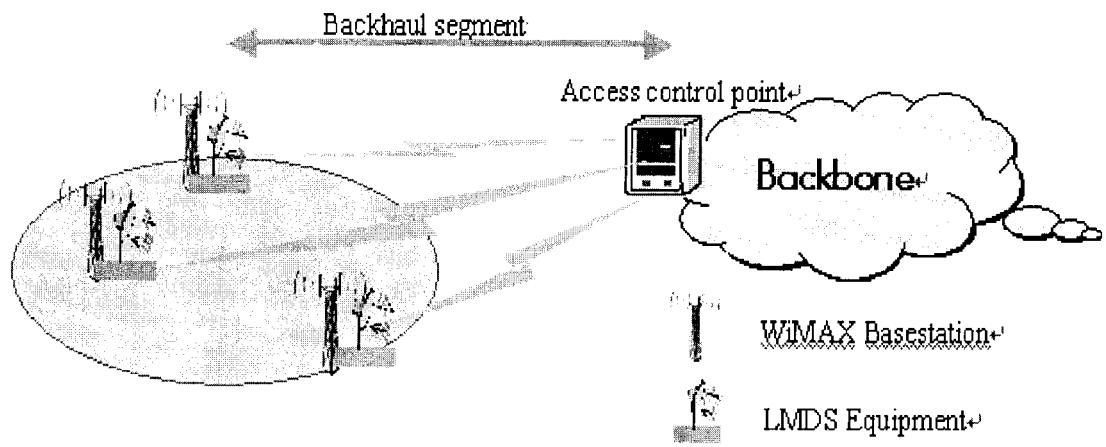
FIG. 1 is a schematic view of using the LMDS technique to provide wireless return channels for large-scale WiMAX deployment as disclosed in the prior art.
Figure 2:
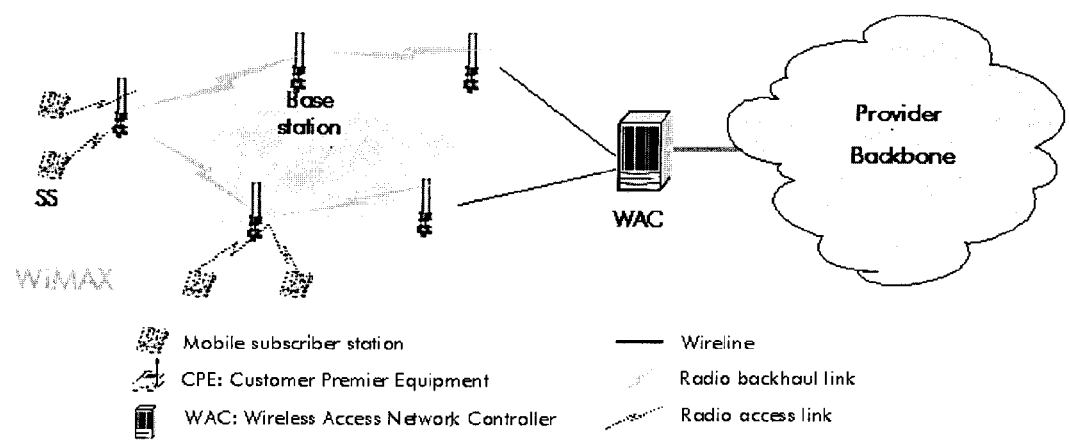
FIG. 2 is a schematic layout view of an end-to-end network of a wireless self-backhaul system.
Figure 3:
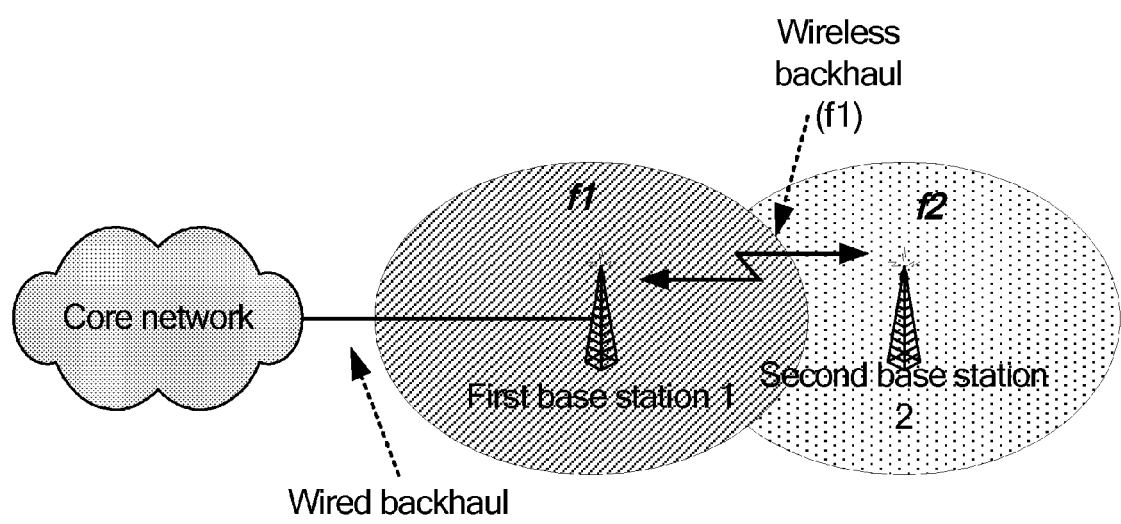
FIG. 3 is a schematic layout view of a single-hop wireless backhaul network.

FIG. 3 is a schematic layout view of a single-hop wireless backhaul network according to the present invention. In the figure, a first base station 1 (BS1, master base station) works in the frequency f1 and has wired backhaul links to a core network (or wireless access control equipment). A second base station 2 (BS2, slaver base station) works in the frequency f2 and has no wired backhaul link. BS2 implements wireless backhaul by using BS1 and communicates with BS1 as a subscriber station of BS1 at a specific moment during the backhaul operation. When BS2 serves its local subscriber stations, it works in base station mode (the frequency is f2); while BS2 implements wireless backhaul traffic, it works in subscriber station mode (the frequency is f1).

Figure 4:
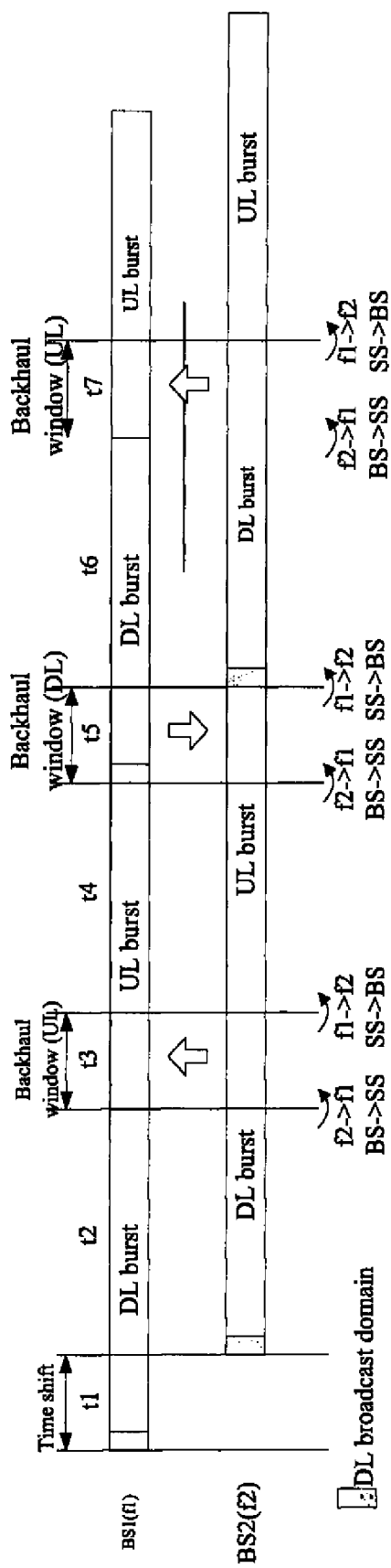
FIG. 4 is a schematic view of frame structures of a second base station and a first base station 1 when a time offset method according to the present invention is used in the single-hop wireless backhaul network.

FIG. 4 illustrates a period of time t1 between the frame start time of second base station 2 (BS2) and the frame of first base station L(BS1) after the above time offset method is used in the single wireless backhaul network. A downlink broadcast domain in FIG. 4 comprises preamble, DL-MAP, UL-MAP, and broadcast messages concerning link allocation and status, such as DCD and UCD, which belongs to system synchronization and transmission operation performed by all customer premise equipment of one of base stations in accordance with received downlink broadcast domains. Thus, when two base stations have the same frame length (wireless systems generally has such a requirement in order to facilitate management control and anti-interference), the frame start time will be adjusted in accordance with concrete radio resource scheduling algorithm and radio resource reservation algorithm and has a certain time offset, so as to ensure that second base station 2 (BS2) will accomplish the wireless backhaul functionality, i.e. can receive downlink broadcast domain information of BS1 as customer premise equipment of first base station 1 (BS1, master base station). The above period of time offset forms uplink backhaul windows (t3, t7) and a downlink backhaul window (t5), which have the same size to ensure that when second base station 2 (BS2) works in base station mode, its uplink operation (t4) and downlink operations (t2, t6) totally correspond to uplink/downlink operations of first base station 1 (BS1) to prevent possible interference. In the single-hop wireless backhaul solution based on the time offset method, first base station 1 (BS1, master base station) works in base station mode all along, and second base station 2 (BS2, slaver base station) switches between base station mode and subscriber station mode. In base station mode, BS2 performs the access functionality for local users, while in subscriber station mode, BS2 is used for implementing uplink backhaul and downlink backhaul traffic with first base station 1.

Figure 5:
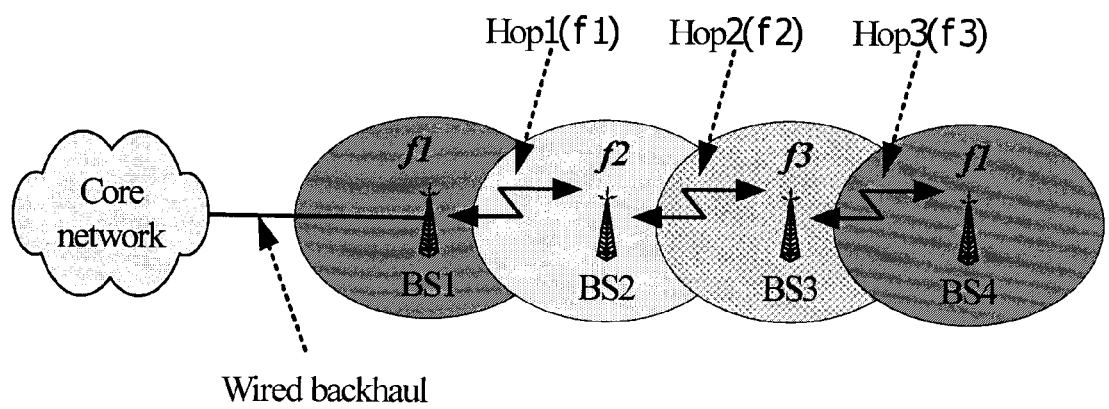
FIG. 5 is a schematic layout view of a multi-hop wireless backhaul network according to the present invention.

FIG. 5 illustrates a schematic layout view of a multi-hop wireless backhaul network according to the present invention. Only a first base station 1 (BS1) has wired backhaul links to a core network (or radio access control equipment), wireless backhaul is used between a second base station 2 (B2) and first base station 1 (BS1), and also between a third base station (BS3) and second base station 2 (BS2), and on the analogy of this. BS1, BS2 and BS3 each have an independent operating frequency, and because of the long distance from BS1, BS4 can either reuse the operating frequency f1 of BS1 or use a separate frequency point in accordance with the strength of interference.

In such a multi-hop structure, BS1 that has wired backhaul links is a root base station, BS4 is a leaf base station, and BS2 and BS4 are intermediate base stations. An intermediate base station relays traffic of the next-level base station, and its own traffic and the traffic of the next-level base station needs to be relayed by the last-level base station. Here, each last-level base station is called Master of its next-level base station, and a next-level base station is called Slaver. When a Slaver transfers a backhaul operation, it will switch to subscriber station mode from normal base station mode and become customer premise equipment of its Master. During this process, the frequency is switched, and backhaul traffic is implemented by using frequency resources of its Master. In each hop, the size of a backhaul window is determined during the network establishment stage, which is equal to the time offset between this base station and its Master.

Figure 6:
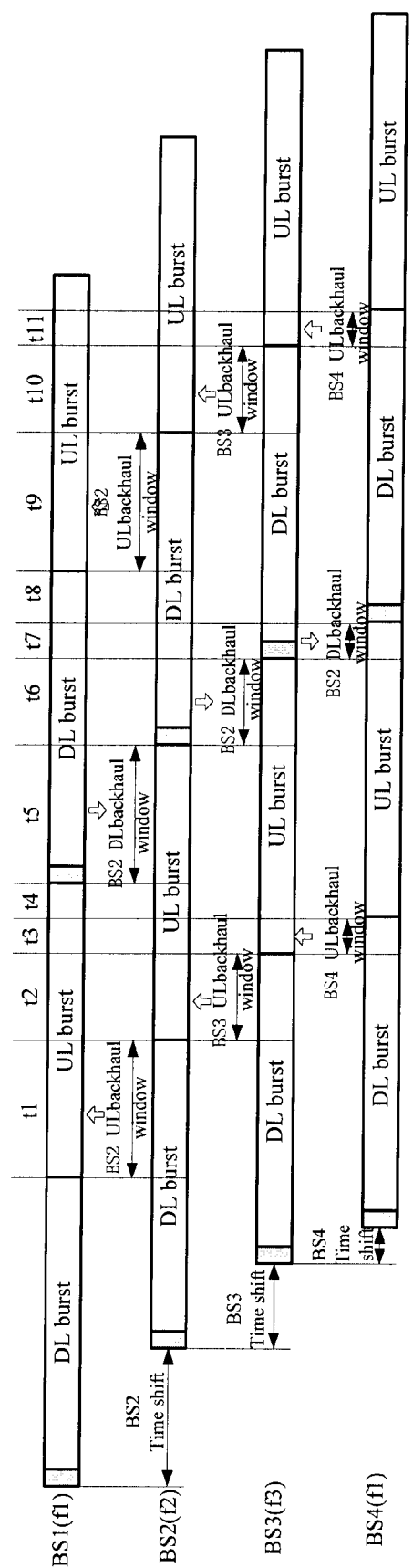
FIG. 6 is a schematic view of frame structures of a plurality of base stations when the time offset method according to the present invention is used in the multi-hop wireless backhaul network.

FIG. 6 illustrates a period of time offset t1 between the frame start time of each level base station, except the Master, and the frame of its last-level base station when the above time offset method is used in a multi-hop wireless backhaul operation. A period of time offset between the frames of base stations at any two levels form uplink backhaul windows and a downlink backhaul window between the base stations at said two levels, which have the same size to ensure that when the next-level base station works in base station mode, its uplink operation and downlink operation completely correspond to uplink/downlink operations of the last-level base station to prevent possible interference. Similar to single-hop backhaul, in the multi-hop backhaul solution based on the time offset method, first base station 1 (BS1, master base station) works in base station mode all along, and second, third and fourth base stations (BS2-4, slaver base stations) switch between base station mode and subscriber station mode to implement uplink backhaul and downlink backhaul and perform the access functionality for local users.

Figure 7:
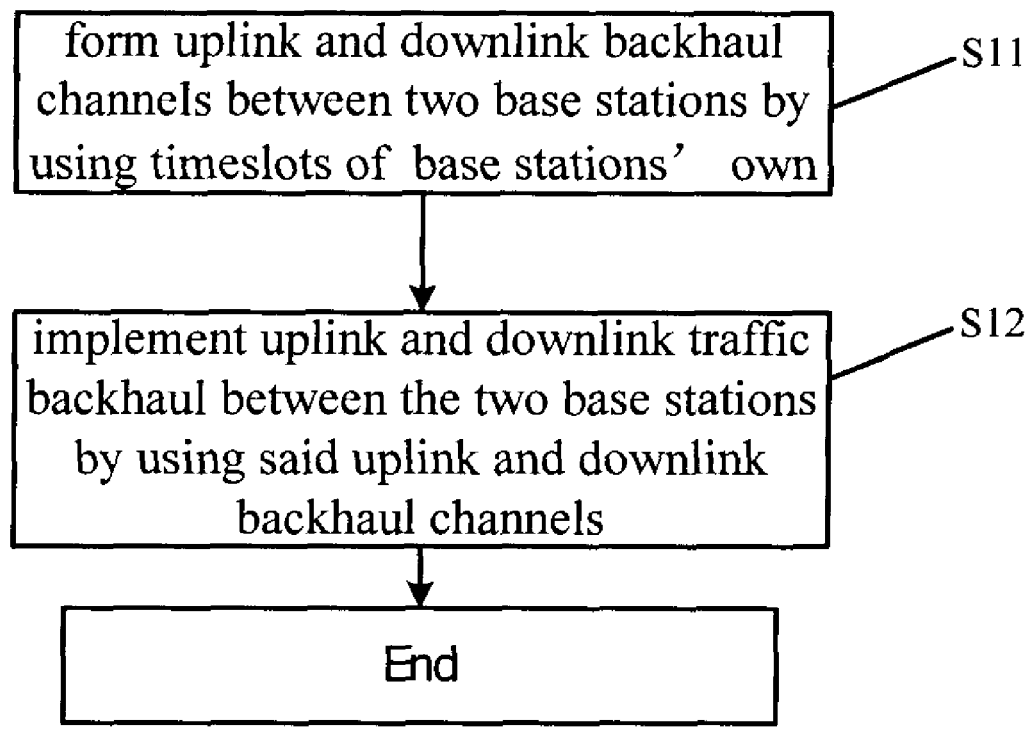
FIG. 7 is a flowchart of a method of implementing wireless traffic backhaul between first base station 1 and second base station 2 of the wireless communication network according to an embodiment of the present invention.

FIG. 7 illustrates a flowchart of a method of implementing wireless traffic backhaul between first base station 1 and second base station 2 in a wireless communication network according to an embodiment of the present invention.

As illustrated in FIG. 7, in step S11, an uplink backhaul channel and a downlink backhaul channel are formed between said first base station 1 and said second base station 2 by using the base stations' own timeslots. Preferably, the frame start time of the second base station can offset for a period of time in relation to the frame of the first base station, so as to form an uplink backhaul channel and a downlink backhaul channel between said first base station and said second base station, just as illustrated in FIG. 4. It should be understood that the above time offset of the frame start time can be preset in the base station.

Then, in step S12, uplink and downlink traffic backhaul is implemented between said first base station and said second base station by using said uplink backhaul channel and said downlink backhaul channel. In a specific embodiment, the following steps can be comprised:

determining whether said second base station will switch between local user access traffic and wireless backhaul traffic;

when it is determined that said second base station will switch between local user access traffic and wireless backhaul traffic, switching the operating mode of said second base station. More specifically, when backhaul traffic is implemented, said second base station switches from a second operating frequency to a first operating frequency, wherein said second operating frequency is used by the second base station for local user access traffic, and said first operating frequency is used by the first base station for local user access traffic; when backhaul traffic is ended, said second base station switches from said first operating frequency back to the first operating frequency.

When the network is a multi-hop wireless backhaul network, second base station 2 can further serve as the master base station of a third base station 3, and the above method can further comprise the following steps:

forming an uplink backhaul channel and a downlink backhaul channel between said second base station 2 and said third base station 3 by using the base stations' own timeslots. Preferably, the frame start time of third base station 3 can offset for a period of time in relation to the frame of second base station 2, so as to form an uplink backhaul channel and a downlink backhaul channel between said second base station 2 and said third base station 3, just as illustrated in FIG. 6. It should be understood that the above time offset of the frame start time can be preset in the base station.

implementing uplink and downlink traffic backhaul between said second base station and said third base station by using said uplink backhaul channel and said downlink backhaul channel. In a specific embodiment, the following steps can be comprised: determining whether said third base station 3 will switch between local user access traffic and wireless backhaul traffic; when it is determined that said third base station 3 will switch between local user access traffic and wireless backhaul traffic, switching the operating mode of said third base station. More specifically, the step of switching the operating mode of the third base station comprises: when backhaul traffic is implemented, said third base station 3 switches from a third operating frequency to a second operating frequency, wherein said third operating frequency is used by the second base station for local user access traffic; when backhaul traffic is ended, said third base station 3 switches from said second operating frequency back to the third operating frequency.

said second base station sending to said first base station received backhaul information from the third base station via the uplink backhaul channel with the first base station;

said second base station sending to said third base station received backhaul information from the first base station via the uplink backhaul channel with the third base station.

Figure 8:
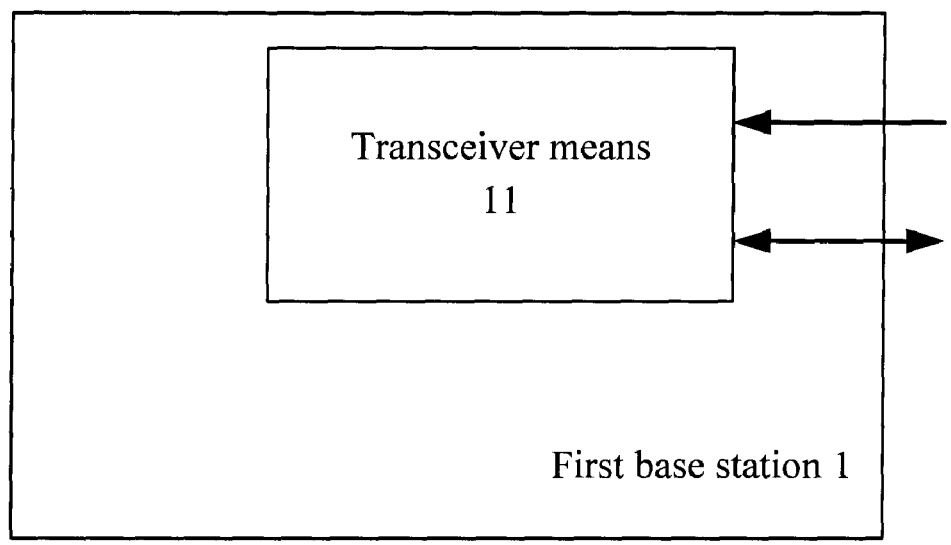
FIG. 8 is a block diagram of a master base station 1 in the wireless communication network according to an embodiment of the present invention.

FIG. 8 illustrates a block diagram of master base station 1 in the wireless communication network according to an embodiment of the present invention, in which first base station 1 is the master base station of the second base station and comprises transceiver means 8.

Said transceiver means 11 is used for receiving from and sending to a subscriber station information, and said transceiver means 21 is further used for receiving from and sending to the second wireless base station backhaul information over uplink and downlink backhaul channels between said base station 2 and said second base station that are formed by using the base stations' own timeslots. Preferably, as illustrated in FIG. 4, said uplink backhaul channel and said downlink backhaul channel can be formed by offsetting the frame start time of the second base station for a period of time in relation to the frame of the first base station. It should be understood that the above time offset of the frame start time can be preset in the base station.

Figure 9:
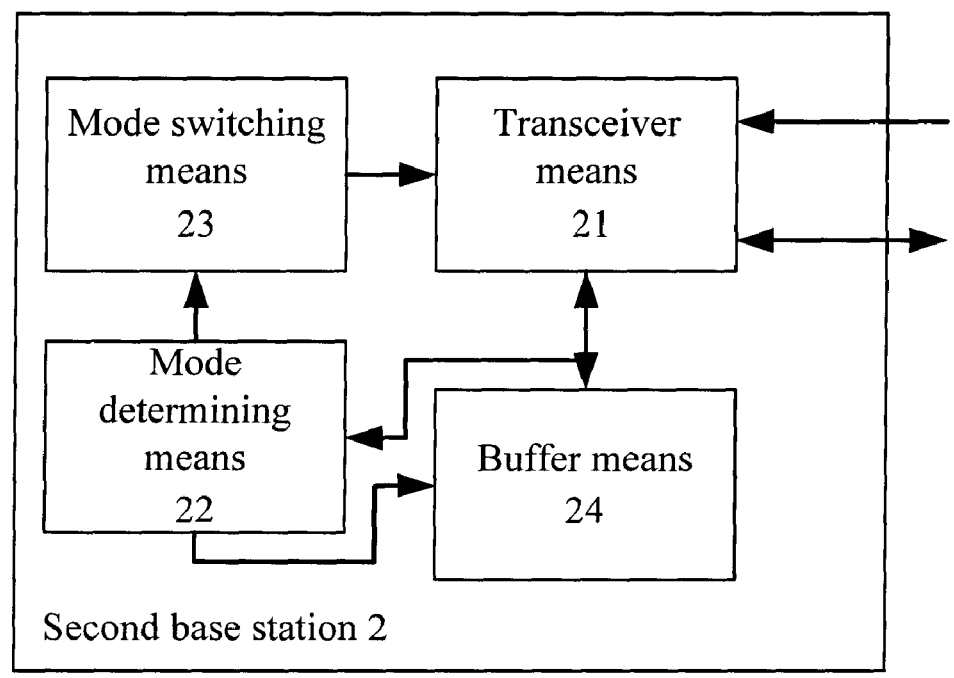
FIG. 9 is a block diagram of a slaver base station 2 in the wireless communication network according to an embodiment of the present invention.

FIG. 9 illustrates a bock diagram of slaver base station 2 in the wireless communication network according to an embodiment of the present invention, which comprises transceiver means 21, mode determining means 22, mode switching means 23 and buffer means 24. Said transceiver means 21 is used for receiving from or sending to a subscriber station information and is further used for receiving from and sending information to the first wireless base station backhaul over uplink and downlink backhaul channels between said base station and said first base station that are formed by using the base stations' own timeslots. The uplink backhaul channel and the downlink backhaul channel between second base station 2 and first base station 1 are formed by offsetting the frame start time of said base station for a period of time in relation to the frame of said first base station. It should be understood that the above time offset of the frame start time can be preset in the base station.

Said mode determining means 22 is used for determining whether said base station will switch between local user access traffic and wireless backhaul traffic.

Said mode switching means 23 is used for switching the operating mode of said base station when it is determined that said base station will switch between local user access traffic and wireless backhaul traffic. In a specific embodiment, when it is determined that second base station 2 will switch from local user access traffic to backhaul traffic, said mode switching means 23 switches a second operating frequency to a first operating frequency, wherein said second operating frequency is used by second base station 2 for local user access traffic, and said first operating frequency is used by first base station 1 for local user access traffic; when it is determined that backhaul traffic is ended, said mode switching means 23 switches said first operating frequency back to the first operating frequency.

In the multi-hop wireless backhaul network as illustrated in FIG. 5, second base station 2 can further serve as the master base station of a third base station. In this case, said transceiver means 21 is further used for receiving from and sending to third wireless base station 3 backhaul information over uplink and downlink backhaul channels between second base station 2 and said third base station 3 that are formed by using the base stations' own timeslots. The uplink backhaul channel and the downlink backhaul channel between second base station 2 and third base station 3 are formed by offsetting the frame start time of said third base station for a period of time in relation to the frame of said base station.

Said buffer means 24 is used for buffering backhaul information from the first base station and the second base station. When second base station 2 can be used as a relay station between the first base station and the second base station, said transceiver means 23 can further be used for sending the buffered backhaul information from third base station 3 to the first base station via said uplink backhaul channel with said first base station, and used for sending the buffered backhaul information from the first base station to the third base station via the uplink backhaul channel with said third base station. In this manner, second base station 2 can function as a wireless relay station between the first base station and the third base station.

Figure 10:
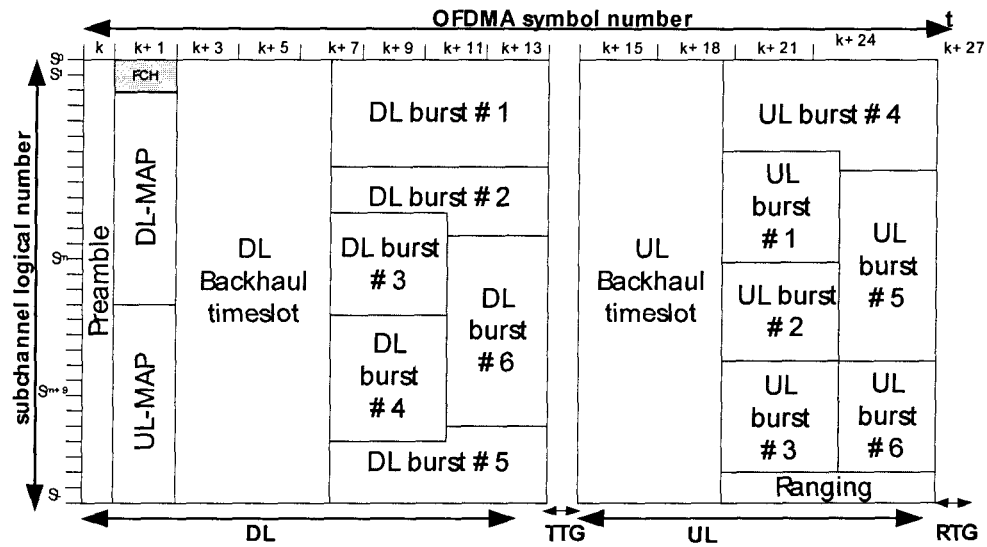
FIGS. 10 and 11 are a schematic view of a frame format of the master base station and the slaver base station respectively in a WiMAX system according to an embodiment of the present invention.
Figure 11:
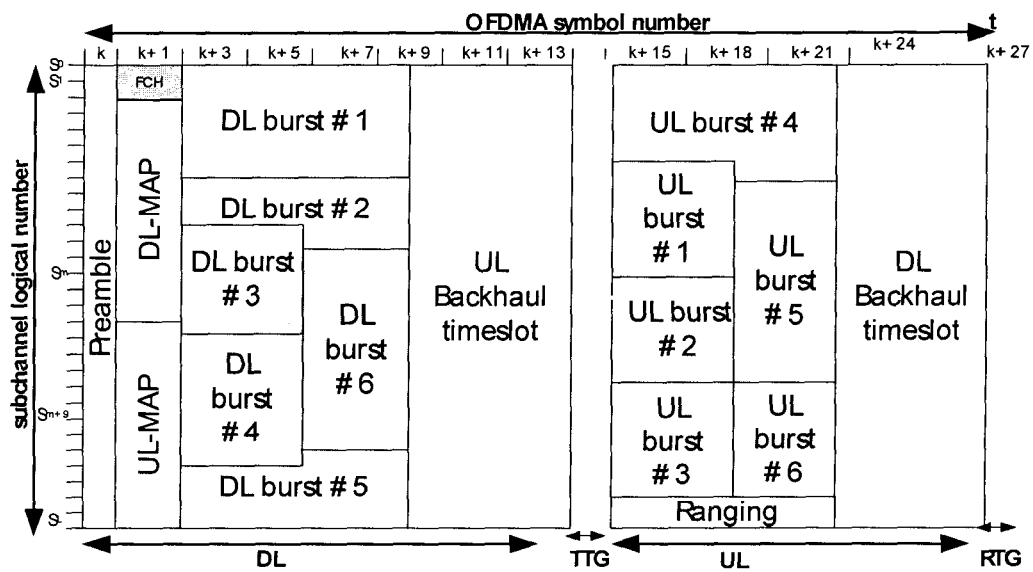

To facilitate actual implementation and future standardization work, the present invention defines frame formats used by the master base station and the slaver base station in the WiMAX system, respectively. FIG. 10 illustrates a schematic view of a frame format of the master base station in the WiMAX system according to an embodiment of the present invention, and FIG. 11 illustrates a schematic view of a frame format of the slaver base station in the WiMAX system according to an embodiment of the present invention. Such definitions enable the timeslot for wireless self backhaul to be located at a relatively fixed position, which not only facilitates scheduling and allocation of radio resources but also creates favorable conditions for interworking between different equipment. The base station frame structured defined by the present invention not only can implement communication between base stations according to the present invention but also completely conforms to prior technical standards, i.e. can achieve interworking with WiMAX devices by other manufacturers and provides complete backward compatibility.

The embodiments of the present invention have been described above. According to the embodiments, the above system is an access network using the Ethernet technique, access network CO equipment 10 is IP-DSLAM, and messages are controlled based on the existed IGMP. However, the present invention is not limited to the specific system, equipment or protocol. Various modifications or alterations can be made by those skilled in the art without departing from the scope as defined by the appended claims.

What is claimed is:

1. A method of implementing wireless traffic backhaul between a first base station and a second base station in a wireless communication network, the method comprising:
   a) forming an uplink backhaul channel and a downlink backhaul channel between said first base station and said second base station by using timeslots of base stations' own; and
   b) implementing uplink and downlink traffic backhaul between said first base station and said second base station by using said uplink backhaul channel and said downlink backhaul channel;
   wherein the first and second base stations use the same frame length, each frame comprising a downlink and a consecutive uplink part;
   wherein a time offset is determined in accordance with a radio resource scheduling algorithm and a radio resource reservation algorithm;
   wherein the time offset is used to offset the frame start time of the second base station in relation to the frame start time of the first base station, so as to form an uplink backhaul window and a downlink backhaul window between the first base station and the second base station;
   wherein the duration of the downlink backhaul window and the uplink backhaul window is equal to the time offset;
   wherein the first base station is a master of the second base station and the second base station is a slave of the first base station;
   wherein backhaul traffic is between the master base station and slave base station, and any local user access traffic is between either the master base station or slave base station and a mobile station.

2. The method according to claim 1, wherein said second base station is a slave base station of said first base station, and b) comprises:
   determining whether said second base station will switch between local user access traffic and wireless backhaul traffic; and
   switching an operating mode of said second base station when it is determined that said second base station will switch between local user access traffic and wireless backhaul traffic.

3. The method according to claim 2, wherein said switching an operating mode of the second base station comprises:
   when backhaul traffic is implemented, switching said second base station from a second operating frequency to a first operating frequency, wherein said second operating frequency is used by the second base station for local user access traffic and said first operating frequency is used by the first base station for local user access traffic; and
   when backhaul traffic is ended, switching said second base station from said first operating frequency back to the second operating frequency.

4. The method according to claim 1, wherein said second base station is a master base station of a third base station, the method further comprising:
   forming an uplink backhaul channel and a downlink backhaul channel between said second base station and said third base station by using timeslots of base stations' own; and
   implementing uplink and downlink traffic backhaul between said second base station and said third base station by using said uplink backhaul channel and said downlink backhaul channel;
   wherein the second and third base stations use the same frame length as the first and second base stations, each frame comprising a downlink and a consecutive uplink part;
   wherein the second time offset is determined in accordance with said radio resource scheduling algorithm and said radio resource reservation algorithm;
   wherein said second time offset is used to offset the frame start time of the third base station in relation to the frame start time of the second base station, so as to form a second uplink backhaul window and a second downlink backhaul window between said second base station and said third base station;
   wherein the duration of said second downlink backhaul window and said second uplink backhaul window is equal to said second time offset.

5. The method according to claim 4, wherein said third base station is a slave base station of said second base station, and wherein the method further comprises:
   determining whether said third base station will switch between local user access traffic and wireless backhaul traffic; and
   switching the operating mode of said third base station when it is determined that said third base station will switch between local user access traffic and wireless backhaul traffic.

6. The method according to claim 5, wherein said switching an operating mode of the third base station comprises:
   when backhaul traffic is implemented, switching said third base station from a third operating frequency to a second operating frequency, wherein said second operating frequency is used by the second base station for local user access traffic; and when backhaul traffic is ended, switching said third base station from said second operating frequency back to the third operating frequency.

7. The method according to claim 4, further comprising:

said second base station sending received backhaul information from the third base station to the first base station via the uplink backhaul channel with said first base station; and said second base station sending received backhaul information from the first base station to the third base station via the uplink backhaul channel with said third base station.

8. The method according to claim 1, wherein said wireless communication network is a WiMAX network.

9. A slave base station for implementing wireless backhaul in conjunction with a master base station in a wireless communication network, said slave base station comprising:

transceiver means for receiving from or sending to a subscriber station information;

wherein said transceiver means is further used for receiving from and sending to the master base station backhaul information over uplink and downlink backhaul channels between said slave base station and said first base station that are formed by using timeslots of base stations' own;

wherein the slave base station is configured to use the same frame length as the master base station, each frame comprising a downlink and a consecutive uplink part;

wherein the slave base station is configured for applying a time offset to determine its frame start time in relation to the frame start time of the master base station, so as to form an uplink backhaul window and a downlink backhaul window between the slave base station and the master base station;

wherein the duration of the downlink backhaul window and the uplink backhaul window is equal to the time offset;

wherein backhaul traffic is between the master base station and slave base station, and any local user access traffic is between either the master base station or slave base station and a mobile station.

10. The slave base station according to claim 9, further comprising:

mode determining means for determining whether said slave base station will switch between local user access traffic and wireless backhaul traffic; and mode switching means for switching the operating mode of said slave base station when it is determined that said slave base station will switch between local user access traffic and wireless backhaul traffic.

11. The slave base station according to claim 10, wherein said mode determining means is further used for, when backhaul traffic is implemented, switching a second operating frequency to a first operating frequency, wherein said second operating frequency is used by said slave base station for local user access traffic and said first operating frequency is used by the master base station for local user access traffic; and for, when backhaul traffic is ended, switching said first operating frequency back to the first operating frequency.

12. The slave base station according to claim 9, wherein said slave base station further serves as an intermediate base station of a third base station, wherein said transceiver means is further used for receiving from and sending to the third base station backhaul information over uplink and downlink backhaul channels between said intermediate base station and said third base station that are formed by using timeslots of base stations' own;

wherein the intermediate base station is configured for applying a second time offset to form a second uplink backhaul window and a second downlink backhaul window between the intermediate base station and the third base station;

wherein the duration of said second downlink backhaul window and said second uplink backhaul window is equal to said second time offset.

13. The slave base station according to claim 12, further comprising:

buffer means for buffering backhaul information from the master base station and the third base station;

wherein said transceiver means is further used for sending received backhaul information from the third base station to the master base station via the uplink backhaul channel with said master base station.

14. The base station according to claim 13, wherein said transceiver means is further used for sending received backhaul information from the master base station to the third base station via the uplink backhaul channel with said third base station.

15. The base station according to claim 9, wherein said wireless communication network is a WiMAX network.

16. The method according to claim 1, wherein the uplink backhaul window is located at the end of the downlink part of the second base station and the beginning of the uplink part of the first base station;

wherein the downlink backhaul window is located at the end of the uplink part of the second base station and the beginning of the downlink part of the first base station.

17. The method according to claim 4, wherein the second uplink backhaul window is located at the end of the downlink part of the third base station and the beginning of the uplink part of the second base station;

wherein the second downlink backhaul window is located at the end of the uplink part of the third base station and the beginning of the downlink part of the second base station.

18. The slave base station of claim 9, wherein the uplink backhaul window is located at the end of the downlink part of the slave base station and the beginning of the uplink part of the master base station;

wherein the downlink backhaul window is located at the end of the uplink part of the slave base station and the beginning of the downlink part of the master base station.

19. The slave base station according to claim 12, wherein the second uplink backhaul window is located at the end of the downlink part of the third base station and the beginning of the uplink part of the slave base station;

wherein the second downlink backhaul window is located at the end of the uplink part of the third base station and the beginning of the downlink part of the slave base station.

20. A method of implementing wireless backhaul traffic between a first base station and a second base station in a wireless communication network, comprising:

a) forming an uplink backhaul channel and a downlink backhaul channel between said first base station and said second base station by using timeslots in the base stations' own frames also used for local user access traffic; and b) implementing uplink and downlink backhaul traffic between said first base station and said second base station by using said uplink backhaul channel and said downlink backhaul channel;

wherein a time offset is used to offset the frame start time of the second base station in relation to the frame start time of the first base station, so as to form an uplink backhaul window for the uplink backhaul channel and a downlink backhaul window for the downlink backhaul channel between the first base station and the second base station;

wherein the first base station is a master of the second base station and the second base station is a slave of the first base station;

wherein backhaul traffic is between the master base station and slave base station, and any local user access traffic is between either the master base station or slave base station and a mobile station.

21. The method of claim 20, wherein the first and second base stations use the same frame length, each frame comprising a downlink part and an uplink part.

22. The method of claim 20, wherein the time offset is determined in accordance with a radio resource scheduling algorithm and a radio resource reservation algorithm.

23. The method of claim 20, wherein the duration of the downlink backhaul window and the duration of the uplink backhaul window is equal to the time offset.

* * * * *